United States Patent
Park et al.

(10) Patent No.: US 9,738,260 B2
(45) Date of Patent: Aug. 22, 2017

(54) WIPER BLADE APPARATUS FOR VEHICLE WITH IMPROVED ASSEMBLABILITY

(71) Applicant: DY AUTO Corporation, Asan-si (KR)

(72) Inventors: Wi Young Park, Incheon (KR); Sung Jun Yoon, Incheon (KR)

(73) Assignee: DY AUTO Corporation (KR)

( * ) Notice: Subject to any disclaimer, the term of this patent is extended or adjusted under 35 U.S.C. 154(b) by 419 days.

(21) Appl. No.: 14/638,462

(22) Filed: Mar. 4, 2015

(65) Prior Publication Data
US 2015/0266453 A1 Sep. 24, 2015

(30) Foreign Application Priority Data

Mar. 21, 2014 (KR) .................. 10-2014-0033673

(51) Int. Cl.
*B60S 1/38* (2006.01)
*B60S 1/40* (2006.01)

(52) U.S. Cl.
CPC ........... *B60S 1/3851* (2013.01); *B60S 1/3855* (2013.01); *B60S 1/3858* (2013.01); *B60S 1/3863* (2013.01); *B60S 1/3867* (2013.01); *B60S 1/4009* (2013.01); *B60S 1/381* (2013.01); *B60S 1/3881* (2013.01)

(58) Field of Classification Search
CPC ...... B60S 1/3849; B60S 1/381; B60S 1/3851; B60S 1/3848; B60S 1/3853; B60S 1/3855; B60S 1/3867; B60S 1/3881; B60S 1/3858; B60S 1/3887; B60S 1/4009
USPC ....................... 15/250.32, 250.201
See application file for complete search history.

(56) References Cited

U.S. PATENT DOCUMENTS

| 8,191,200 B2 | 6/2012 | Kim | |
|---|---|---|---|
| 2014/0115808 A1* | 5/2014 | Park | B60S 1/3849 |
| | | | 15/250.32 |

FOREIGN PATENT DOCUMENTS

| CN | 101311043 A | | 11/2008 |
|---|---|---|---|
| DE | 19835065 | * | 2/2000 |
| KR | 100732691 B1 | | 5/2007 |
| KR | 100840000 B1 | | 6/2008 |
| KR | 20080094204 A | | 10/2008 |
| KR | 100965425 B1 | | 6/2010 |
| KR | 20110116521 A | | 10/2011 |

(Continued)

OTHER PUBLICATIONS

Notice of Allowance from Korean Intellectual Property Office Application No. 10-2014-0033673 Issued: Nov. 17, 2014 8 pages.

*Primary Examiner* — Gary Graham
(74) *Attorney, Agent, or Firm* — St Onge Steward Johnston and Reens LLC

(57) ABSTRACT

A wiper blade apparatus for a vehicle includes: a vertebra that is a rod-like elongated member; a first connection member disposed at a central upper portion of the vertebra, provided with a rotational shaft fixed to the vertebra; and a center support including a plurality of elastic hook sections supporting a top surface of the vertebra so that the center support is fixed to the vertebra. The elastic hook sections forcibly pass through a space between the vertebra and a hook release prevention section extending downward from a sidewall of the first connection member and are elastically fixed to the top surface of the vertebra. The center support is assembled upward from a lower side of the vertebra after the first connection member is assembled with the vertebra.

6 Claims, 6 Drawing Sheets

(56) References Cited

FOREIGN PATENT DOCUMENTS

KR 101220461 B1 1/2013

* cited by examiner

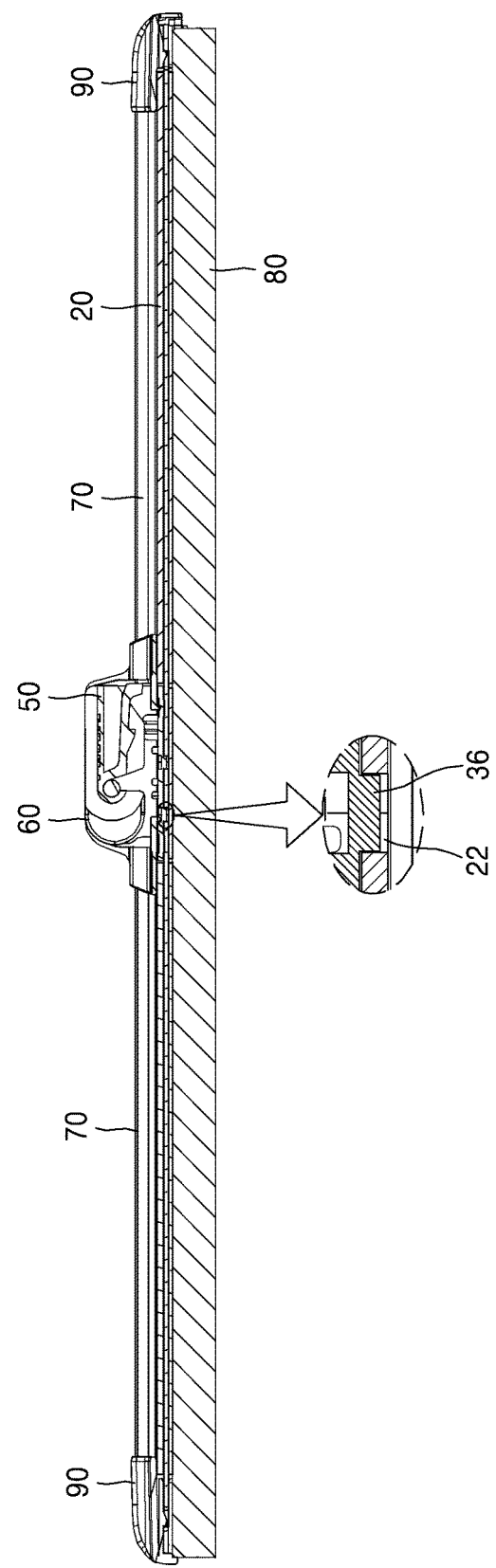

WIPER BLADE APPARATUS FOR VEHICLE WITH IMPROVED ASSEMBLABILITY

FIELD OF THE INVENTION

One or more exemplary embodiments relate to a wiper blade apparatus for a vehicle, and more particularly, to a flat-blade type wiper apparatus.

BACKGROUND OF THE INVENTION

A blade assembly for cleaning a windshield of a vehicle is an active safety device as well as a device that provides user convenience, which is installed to ensure a driver's view by removing foreign substances or rain drops on a glass surface of the windshield.

Generally, the blade assembly for cleaning the windshield of the vehicle includes a wiper strip that slides on and contacts the windshield and has rubber elasticity, a vertebra that elastically supports the wiper strip, and a retainer and a coupling device as a coupling assembly for firmly fixing the wiper strip to a wiper arm. Generally, the retainer has a tournament structure, so as to accommodate a deviation in contact between the wiper strip and the windshield, according to a difference in curvature of the windshield between the wiper strip and the retainer. The tournament structure may include a space between the wiper strip and the retainer. Recently, as roads have been improved for high-speed driving and the performance of a vehicle has been enhanced, a problem of an existing blade assembly to clean the windshield has been raised. That is, when a wiper apparatus operates while a vehicle is moving at a high speed of 160 km or more, a lift may be exerted on the blade assembly, and the blade assembly may not properly contact the windshield. Thus, the wiper apparatus may not properly wipe the windshield. In order to solve such a limitation, there is a need to develop a new blade assembly for cleaning the windshield that does not include a retainer structure.

Recently, a wiper apparatus, referred to as a "flat-blade type wiper apparatus", has drawn attention for preventing floating of a wiper while a vehicle is moving at a high speed. In the case of the flat-blade type wiper apparatus, a vertebra that supports a wiper lip is configured with a spoiler-integrated lever, and a connector device for connecting a wiper arm to the wiper apparatus is disposed at a center of the vertebra. Korean Patent Publication No. 2011-0116521 discloses an example of the flat-blade type wiper apparatus.

However, a wiper blade apparatus according to the related art has a configuration in which a connector device for connecting a wiper arm to a blade is coupled to a vertebra, which includes a plurality of caulking or bending processes that are inconvenient for assembling. Therefore, the connector device coupled to the vertebra is difficult to physically separate from the vertebra. Thus, it is inconvenient because it is difficult to separate the connector device when the connector device needs to be replaced while the wiper apparatus is used. In addition, when the connector device malfunctions, a user needs to replace the entire wiper apparatus, thus spending more on replacement of parts. Furthermore, the connector device according to the prior art requires caulking or bending operations during assembling, causing a deterioration in assemblability.

SUMMARY OF THE INVENTION

One or more exemplary embodiments include a wiper blade apparatus for a vehicle, which has improved assemblability by enhancing a configuration of a connector device that connects a wiper arm to a wiper blade.

Additional aspects will be set forth in part in the description which follows and, in part, will be apparent from the description, or may be learned by practice of the presented embodiments.

According to one or more exemplary embodiments, a wiper blade apparatus for a vehicle includes: a vertebra that is a rod-like elongated member made of a metal plate; a first connection member disposed at a central upper portion of the vertebra, provided with a rotational shaft to which a wiper arm is rotatably coupled, and fixed to the vertebra; and a center support including a body disposed on an opposite side of the first connection member, with the vertebra being disposed therebetween, and a plurality of elastic hook sections that protrude and extend from the body, the elastic hook sections elastically supporting a top surface of the vertebra so that the center support is fixed to the vertebra, wherein the center support includes a wiper lip receiving section that supports a wiper lip, the elastic hook sections forcibly pass through a space between the vertebra and a hook release prevention section extending downward from a sidewall of the first connection member and are elastically fixed to the top surface of the vertebra, the hook release prevention section prevents the elastic hook sections from being released from the vertebra in a state of being elastically fixed to the vertebra, the center support is disposed to protrude downward from the first connection member, and the center support is assembled upward from a lower side of the vertebra after the first connection member is assembled with the vertebra.

The first connection member may include a pair of rotation prevention protrusions penetrating between a top surface and a bottom surface of the vertebra. The pair of the rotation prevention protrusions may be spaced apart from each other in a longitudinal direction of the vertebra. The vertebra may include a pair of protrusion receiving holes that receives the rotation prevention protrusions. The first connection member and the vertebra may be fixed at two positions by spot welding.

The wiper blade apparatus may further include a second connection member rotatably coupled to the rotational shaft so as to connect a wiper arm to the wiper blade apparatus.

The wiper blade apparatus may further include a cover member coupled to the first connection member such that the first connection member is not exposed to the outside.

The wiper blade apparatus may further include a pair of spoiler members disposed on both sides of the first connection member such that the spoiler members are coupled to the vertebra along a longitudinal direction of the vertebra.

The wiper blade apparatus may further include end caps coupled to both ends of the vertebra so as to prevent a release of the wiper lip coupled to the spoiler members.

BRIEF DESCRIPTION OF THE DRAWINGS

These and/or other aspects will become apparent and more readily appreciated from the following description of the embodiments, taken in conjunction with the accompanying drawings in which:

FIG. 6 is a cross-sectional perspective view taken along line VI-VI of FIG. 2.

DETAILED DESCRIPTION OF THE INVENTION

Figure 1:
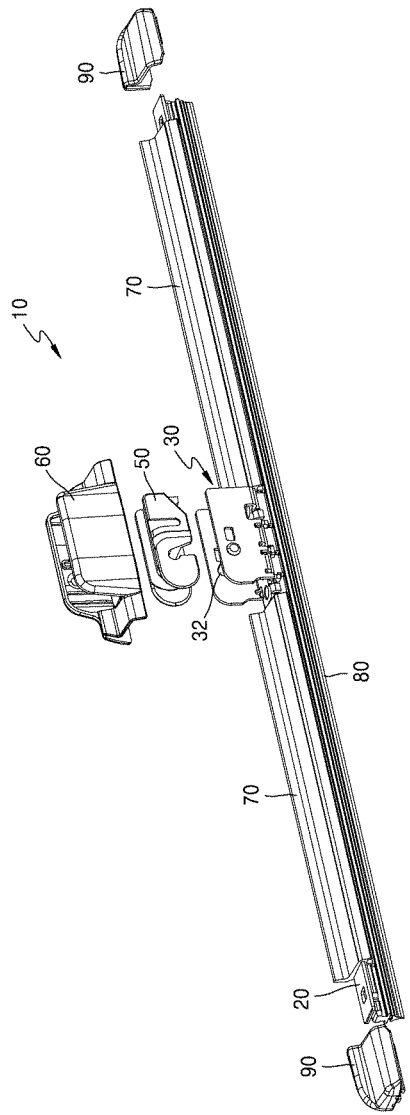
FIG. 1 is an exploded perspective view of a wiper blade apparatus for a vehicle, according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description.

Figure 2:
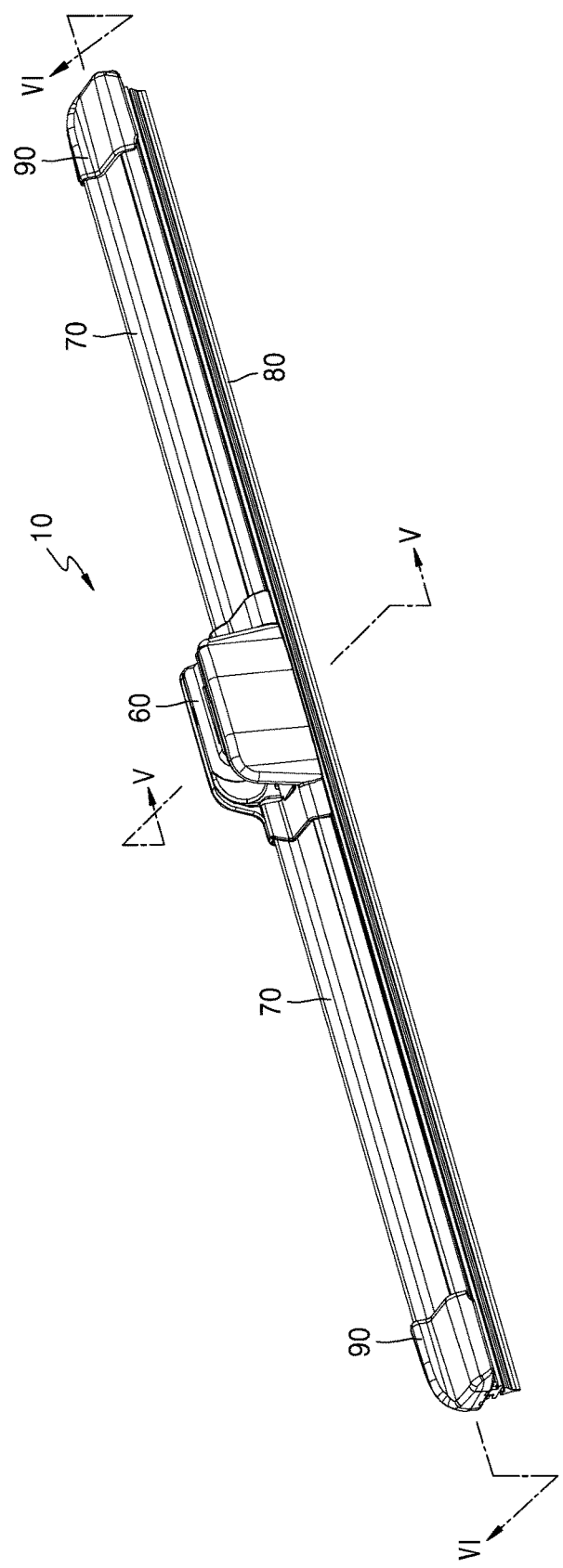
FIG. 2 is a perspective view illustrating an assembled state of the wiper blade apparatus illustrated in FIG. 1.
Figure 3:
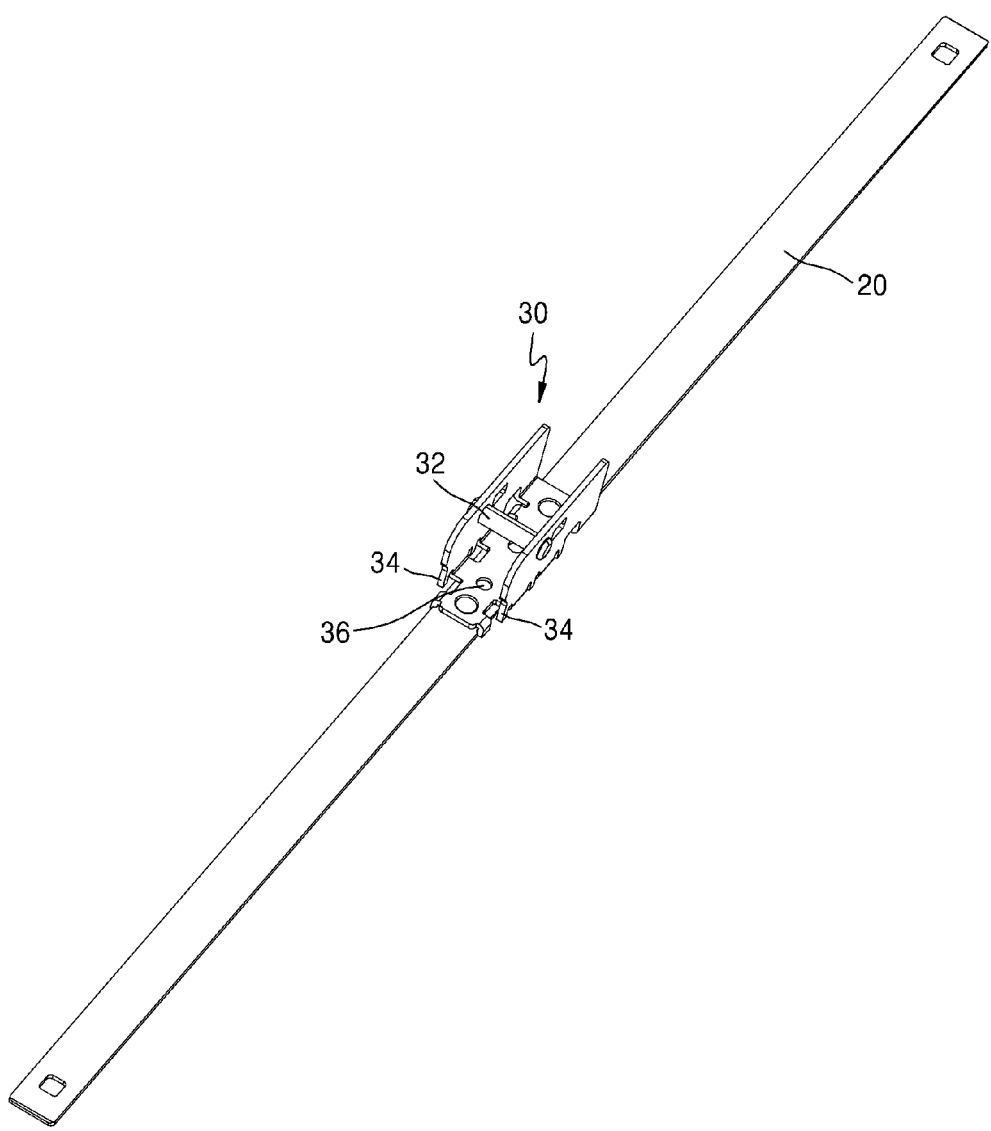
FIG. 3 is a perspective view for describing a connection structure of a vertebra and a first connection member in the wiper blade apparatus illustrated in FIG. 2.
Figure 4:
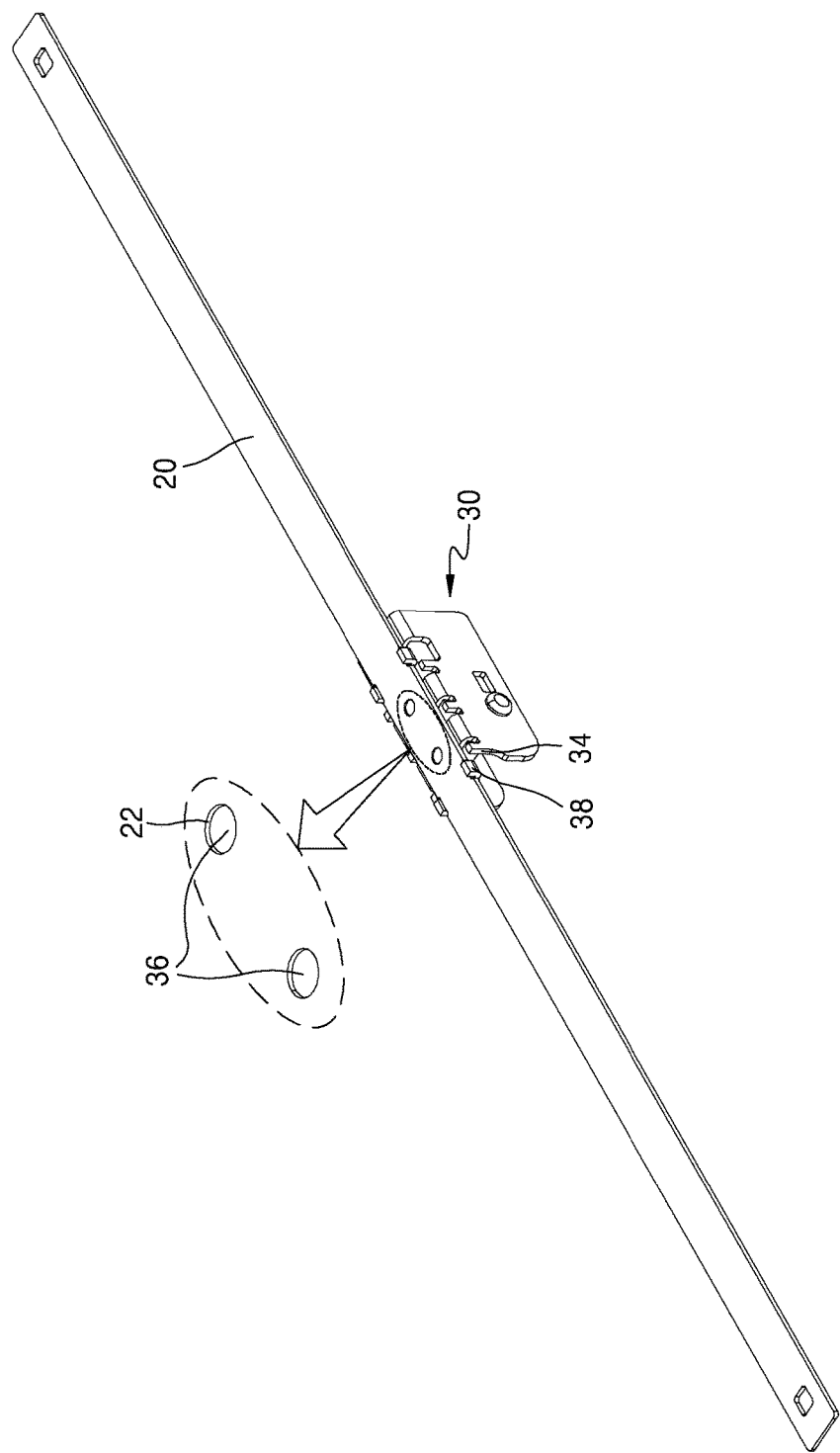
FIG. 4 is a perspective view when viewed from another direction in FIG. 3.
Figure 5:
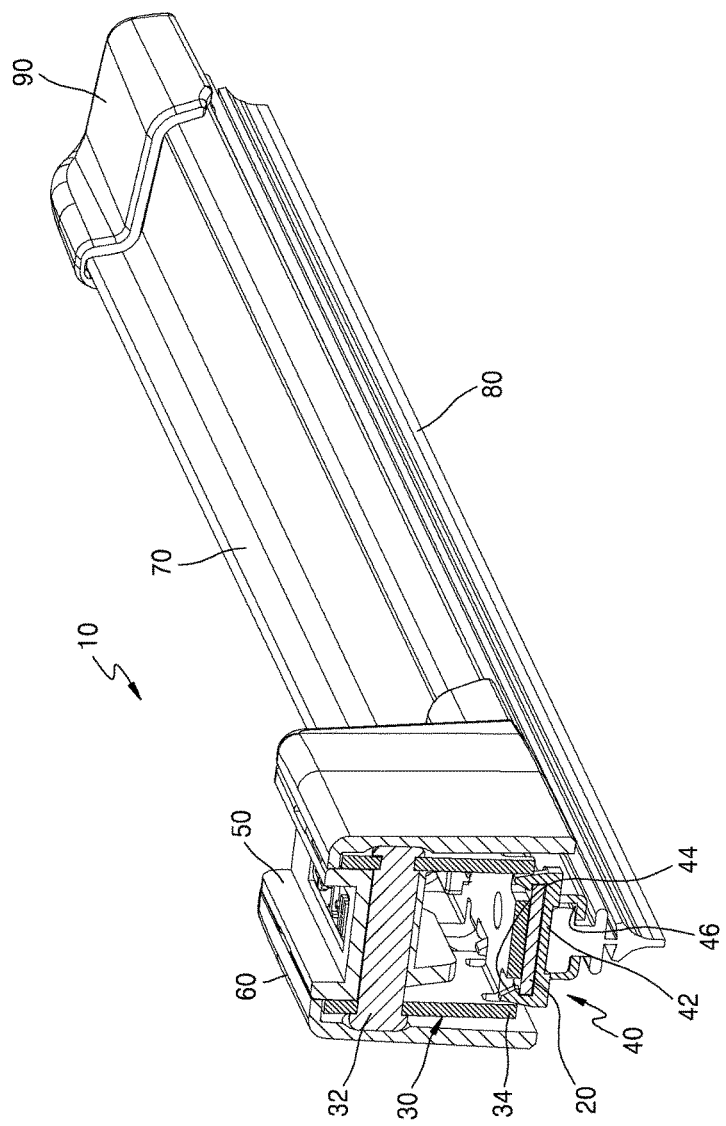
FIG. 5 is a cross-sectional perspective view taken along line V-V of FIG. 2.

FIG. 1 is an exploded perspective view of a wiper blade apparatus 10 for a vehicle, according to an exemplary embodiment. FIG. 2 is a perspective view illustrating an assembled state of the wiper blade apparatus 10 illustrated in FIG. 1. FIG. 3 is a perspective view for describing a connection structure of a vertebra 20 and a first connection member 30 in the wiper blade apparatus 10 illustrated in FIG. 2. FIG. 4 is a perspective view when viewed from another direction in FIG. 3. FIG. 5 is a cross-sectional perspective view taken along line V-V of FIG. 2. FIG. 6 is a cross-sectional perspective view taken along line VI-VI of FIG. 2.

Referring to FIGS. 1 to 6, a wiper blade apparatus 10 (hereinafter, referred to as a "wiper blade apparatus 10") with improved assemblability, according to an exemplary embodiment, is a type of a flat-blade type wiper apparatus.

The wiper blade apparatus 10 may include a vertebra 20, a first connection member 30, a center support 40, a second connection member 50, a cover member 60, a spoiler member 70, a wiper lip 80, and end caps 90.

The vertebra 20 is a rod-like elongated member made of a metal plate. The vertebra 20 allows a wiper lip 80 to come into close contact with a glass surface of the vehicle in a state of having a constant rigidity and elasticity. The vertebra 20 may be made of, for example, a carbon steel or stainless steel. The vertebra 20 may include a pair of protrusion receiving holes 22. The protrusion receiving holes 22 are spaced apart from one another in a longitudinal direction of the vertebra 20. The protrusion receiving holes 22 are formed to receive rotation prevention protrusions 36 provided in the first connection member 30, which will be described below.

The first connection member 30 is disposed at a central upper portion of the vertebra 20. The first connection member 30 is fixed to the vertebra 20. The first connection member 30 is installed to connect a wiper arm to the wiper blade apparatus 10. The first connection member 30 includes a rotational shaft 32. The rotational shaft 32 has a rod-like structure disposed in a width direction of the vertebra 20. The rotational shaft 32 is spaced apart from the top surface of the vertebra 20 in an upward direction. The rotational shaft 32 may be integrally formed with the first connection member 30, or may be made as a separate part and fixed to the first connection member 30 by welding or caulking. The wiper arm is rotatably coupled to the rotational shaft 32.

The first connection member 30 includes a pair of rotation prevention protrusions 36. The rotation prevention protrusions 36 extend downward from the bottom surface of the first connection member 30 and are received in protrusion receiving holes 22 provided in the vertebra 20. That is, the rotation prevention protrusions 36 are formed to penetrate between the top surface and the bottom surface of the vertebra 20. The pair of the rotation prevention protrusions 36 is spaced apart from each other in a longitudinal direction of the vertebra 20. The first connection member 30 is fixed to the vertebra 20 at two positions by spot welding. As described above, since the first connection member 30 is fixed to the vertebra 20 at two positions by spot welding, and the pair of the rotation prevention protrusions 36 are received in the protrusion receiving holes 22, the first connection member 30 and the vertebra 20 are not relatively rotated even when a large torque is applied to the first connection member 30 by the wiper arm. A plurality of caulking sections 38 may extend from sidewalls of the first connection member 30. The plurality of caulking sections 38 are caulked and fixed to sidewalls of the vertebra 20.

The first connection member 30 includes hook release prevention sections 34. The hook release prevention sections 34 extend downward from the sidewalls of the first connection member 30. A space is formed between the hook release prevention sections 34 and the sides of the vertebra 20. The space is narrower than a thickness of an elastic hook section 44, which will be described below. The hook release prevention sections 34 do not extend downward more than to the top surface of the vertebra 20. The bottom surface of the hook release prevention sections 34 is flush with the top surface of the vertebra 20.

The center support 40 is disposed under the vertebra 20. The center support 40 includes a body 42 and an elastic hook section 44. The body 42 is disposed on an opposite side of the first connection member 30, with the vertebra 20 being disposed therebetween. The elastic hook section 44 is a hook-shaped structure that protrudes and extends upward from the body 42. The elastic hook section 44 is provided plurally. In the present exemplary embodiment, six elastic hook sections 44 are provided. The elastic hook section 44 elastically supports the top surface of the vertebra 20 so that the center support 40 is fixed to the vertebra 20. More specifically, the elastic hook sections 44 forcibly pass through the space between the hook release prevention sections 34 and the vertebra 20 and are elastically fixed to the top surface of the vertebra 20. Therefore, the hook release prevention section 34 prevents the elastic hook sections 44 from being released from the vertebra 20 in a state of being elastically fixed to the vertebra 20.

The center support 40 supports the vertebra 20 from below, and the first connection member 30 supports the vertebra 20 from above. Therefore, a central portion of the vertebra 20 is firmly supported by the first connection member 30 and the center support 40. A wiper lip receiving section 46 is provided in the body 42 of the center support 40 so as to support the wiper lip 80. Another wiper lip receiving section 46 having the same structure as above is further formed in the spoiler member 70, which will be described below. Therefore, the wiper lip 80 may be easily assembled and disassembled by sliding the wiper lip 80 along the wiper lip receiving section 46 in a longitudinal direction. The center support 40 may be made of, for example, a synthetic resin such as polypropylene (PP) or acrylonitrile butadiene styrene (ABS).

The second connection member 50 is an auxiliary member that connects the wiper arm to the wiper blade apparatus 10. The second connection member 50 is rotatably coupled to the rotational shaft 32 provided in the first connection member 30.

The cover member 60 is coupled to the first connection member 30. The cover member 60 covers the first connection member 30 such that the first connection member 30 is not exposed to the outside. The cover member 60 may be press-fitted into the first connection member 30 by an elastic deformation of a material. The cover member 60 may be made of a synthetic resin.

A pair of spoiler members 70 are disposed on both sides of the first connection member 30 such that the spoiler members 70 are coupled to the vertebra 20 along the longitudinal direction of the vertebra 20. The spoiler member 70 that guides an air flow to pressurize the wiper blade apparatus 10 during driving, includes the wiper lip receiving section 46 that supports the wiper lip 80.

The wiper lip 80 may be easily assembled and disassembled by sliding the wiper lip 80 along the wiper lip receiving section 46 formed to have the same structure in the spoiler member 70 and the center support 40. The wiper lip 80 is made of an elastic member such as a rubber. The wiper lip 80 slidably contacts and is supported on the glass surface of the vehicle and removes foreign substances from the glass surface of the vehicle.

The end caps 90 are coupled to both ends of the vertebra 20. The end caps 90 serves as stoppers that prevent the release of the wiper lip coupled to the spoiler members 70 and the center support 40. A flip-type open/close cover may be provided in one of the end caps 90 such that the wiper lip 80 is assembled and disassembled without separating the end caps 90.

Next, a process of assembling the wiper blade apparatus 10 will be described.

As illustrated in FIGS. 3 and 4, the first connection member 30 is coupled to the vertebra 20. The pair of the rotation prevention protrusions 36 provided in the first connection member 30 are received in the protrusion receiving holes 22 provided in the vertebra 20. In this state, the first connection member 30 is fixed to the vertebra 20 by spot welding at the outside of the protrusion receiving holes 22. In this manner, the first connection member 30 is firmly fixed to the vertebra 20.

The center support 40 is coupled to the vertebra 20 by pressing the center support 40 upward from the bottom surface of the vertebra 20. During this process, the elastic hook sections 44 provided in the center support 40 forcibly pass through the space between the hook release prevention sections 34 and the vertebra 20, are elastically locked to the top surface of the vertebra 20, and are elastically fixed to the top surface of the vertebra 20. Therefore, the body of the center support 40 comes into close contact with the bottom surface of the vertebra 20.

The pair of the spoiler members 70 is coupled by sliding from the end portion of the vertebra 20. As described above, the wiper lip receiving section 46 capable of supporting the wiper lip 80 is provided in the spoiler member 70 and the center support 40 in the same structure. Accordingly, the upper end portion of the wiper lip 80 is slidingly coupled so as to be received in the wiper lip receiving section 46.

The pair of the end caps 90 are coupled to both ends of the vertebra 20. Since the pair of the end caps 90 prevents the wiper lip 80 from sliding, the wiper lip 80 is fixed to the spoiler member 70 and the center support 40.

The second connection member 50 is coupled to the rotational shaft 32. The second connection member 50 is rotatably coupled to the rotational shaft 32. The cover member 60 is coupled to the first connection member 30.

The wiper blade apparatus 10 assembled through the above-described processes is illustrated in FIG. 2. The assembled wiper blade apparatus 10 may be installed in the vehicle by being coupled to the wiper arm.

In the wiper blade apparatus according to the exemplary embodiment, the center support is elastically coupled to the vertebra so as to improve the assemblability of the center support and the vertebra in the coupling structure of the connector device for coupling the wiper arm to the wiper blade apparatus, and the hook release prevention section extending downward from the sidewall of the first connection member prevents the elastic hook section provided in the center support from being released from the vertebra, thus remarkably improving the assemblability of the connector device and providing improved productivity and assemblability as a whole. That is, since the wiper lip receiving section having the same structure as that provided in the spoiler member is provided in the center support, the wiper lip may be easily assembled and disassembled. Furthermore, since the center support is easily assembled by the elastic hook section in such a state that the first connection member 30 is assembled with the vertebra 20, the assemblability is remarkably improved as compared with the structure of the related art.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:
1. A wiper blade apparatus for a vehicle, comprising:
a vertebra that is a rod shaped elongated member made of a metal plate;
a first connection member disposed at a central upper portion of the vertebra, provided with a rotational shaft to which a wiper arm is rotatably coupled, and fixed to the vertebra; and
a center support including a body disposed on an opposite side of the first connection member, with the vertebra being disposed therebetween, and a plurality of elastic hook sections that protrude and extend from the body, the elastic hook sections elastically supporting a top surface of the vertebra so that the center support is fixed to the vertebra,
wherein the center support comprises a wiper lip receiving section that supports a wiper lip,
the elastic hook sections forcibly pass through a space between the vertebra and a hook release prevention section extending downward from a sidewall of the first connection member and are elastically fixed to the top surface of the vertebra,
the hook release prevention section prevents the elastic hook sections from being released from the vertebra in a state of being elastically fixed to the vertebra,
the center support is disposed to protrude downward from the first connection member, and the center support is assembled upward from a lower side of the vertebra after the first connection member is assembled with the vertebra.

2. The wiper blade apparatus of claim 1,
wherein the first connection member comprises a pair of rotation prevention protrusions penetrating between a top surface and a bottom surface of the vertebra,
the pair of the rotation prevention protrusions is spaced apart from each other in a longitudinal direction of the vertebra,
the vertebra comprises a pair of protrusion receiving holes that receives the rotation prevention protrusions, and
the first connection member and the vertebra are fixed at two positions by spot welding.

3. The wiper blade apparatus of claim 1, further comprising a second connection member rotatably coupled to the rotational shaft so as to connect a wiper arm to the wiper blade apparatus.

4. The wiper blade apparatus of claim 1, further comprising a cover member coupled to the first connection member such that the first connection member is not exposed to the outside.

5. The wiper blade apparatus of claim 1, further comprising a pair of spoiler members disposed on both sides of the first connection member such that the spoiler members are coupled to the vertebra along a longitudinal direction of the vertebra.

6. The wiper blade apparatus of claim 5, further comprising end caps coupled to both ends of the vertebra so as to prevent a release of the wiper lip coupled to the spoiler members.

* * * * *